3,359,214
SURFACE PROPERTIES OF SOLIDS
Victor D. Aftandilian, Watertown, Mass., assignor to Cabot Corporation, Boston, Mass., a corporation of Delaware
No Drawing. Filed Feb. 20, 1964, Ser. No. 346,109
The portion of the term of the patent subsequent to Sept. 19, 1983, has been disclaimed
18 Claims. (Cl. 252—431)

ABSTRACT OF THE DISCLOSURE

The present invention broadly relates to a novel process for improving the surface properties of finely-divided inorganic solids and more specifically to a method for increasing the surface hydroxyl group population of such solids. Said process comprises the steps of:

(1) Reacting hydroxyl groups originally present on the surface of a finely-divided solid with certain halide compounds of Group IVb metals, thereby resulting in chemical bonding of Group IVb metal halide structures to the surface of said solid, and (2) Hydrolyzing said metal halide structures. The resulting solid compositions, due to their increased hydroxyl group population, are unusually efficient catalyst supports for certain types of catalyst components.

---

It has been disclosed, for example, in U.S. patent applications 278,414, 21,110 and 15,815, each now abandoned; and 11,961, 86,868 and 307,786, now U.S. Patents 3,166,541, 3,166,542 and 3.205,177 respectively, that finely-divided solids having chemically bound thereto certain surface structures comprise valuable catalyst components. It has been further disclosed that the ultimate efficiency of said catalyst components is generally directly proportional to and dependent upon the quantity of hydroxyl groups per gram originally present on the surface of the finely-divided solids.

The present invention resides in part in markedly increasing the number of hydroxyl groups on the surface of finely-divided solids, thereby vastly improving the efficiency of said solids, for example, when they are utilized in the processes of the above-mentioned applications for producing catalyst components.

Accordingly, it is a principal object of the present invention to provide finely-divided solids having improved surface qualities.

It is a further object of the present invention to provide a process for increasing the number of hydroxyl groups on the surface of finely-divided solids.

Other objects of the present invention will in part be obvious and will in part appear hereinafter.

In accordance with the present invention it has been discovered that the quantity of hydroxyl groups on the surface of a finely-divided solid can be markedly increased by (a) reacting existing hydroxyl groups on the surface with certain compounds of Group IVb metals and thereafter (b) hydrolyzing the resulting structures chemically bound to the surface of the solid product of reaction. These structures conform to the formula $$T(OH)_cR_b$$

wherein T is a metal of Group IVb; each OH is a hydroxyl group; c is a number from 1 to 3; R is chosen from the group consisting of alkyl, aryl, alkoxy and aryloxy radicals; b is a number from 0 to 1; and wherein said structures are chemically linked from T to at least one oxygen atom in the surface of said solid.

Solids suitable for the purposes of the present invention generally include any finely-divided solid having about $1 \times 10^{-5}$ equivalents per gram of hydroxyl groups on the surface thereof. Greatly preferred, however, are finely-divided solids having an average particle diameter of less than about 0.1 micron and having between about $1 \times 10^{-4}$ and about $2 \times 10^{-3}$ equivalents per gram of hydroxyl groups on the surface thereof, and which, excepting the hydroxyl groups, are substantially inert to the metal compound to be utilized. For example, extremely finely-divided (i.e. metal oxides having an average particle diameter of less than about 0.1 micron) such as titania, zirconia, thoria, magnesia and silica, and carbon blacks such as channel black are all generally preferred for the purposes of the present invention.

It should be noted that, generally speaking, the ultimate surface hydroxyl group concentration of the improved finely-divided solids produced according to the present invention is largely dependent upon the accomplishment of an actual chemical reaction of controlled extent between hydroxyl groups on the surface of the finely-divided solids and the Group IVb metal compounds. Further, it should be borne in mind that, all other factors being equal, the smaller the average particle size of the solid and the larger (within the above limits) the original concentration of hydroxyl groups on the surface thereof, the greater will be the potential surface hydroxyl group concentration achievable in accordance with the present invention. Therefore, it is important to use as the starting material, finely-divided solids having an average particle diameter of less than about 0.1 micron, and preferably less than about 0.05 micron, and having a hydroxyl group content on the surface thereof of at least about $1 \times 10^{-4}$ equivalents per gram. Accordingly, pyrogenic metal or metalloid oxides produced by the vapor phase oxidation or hydrolysis of a corresponding metal or metalloid compound are greatly preferred because they are generally available in average particle diameters of less than about 0.1 micron and normally have substantial quantities of hydroxyl groups on the surface thereof. On the other hand, the hydroxyl group concentration of solids having an original surface hydroxyl group concentration of greater than about $2 \times 10^{-3}$ equivalents per gram is generally not greatly increased because the increased concentration of hydroxyl groups normally imparted in accordance with the present invention has a marked tendency to split off water due to intramolecular condensations. Accordingly, the surface hydroxyl group concentration of many solids such as metal oxides produced by precipitation from aqueous solutions which have a hydroxyl group concentration on the surface thereof of about $2 \times 10^{-3}$ equivalents per gram is not normally substantially increased in accordance with the present invention.

Compounds of Group IVb metals suitable for the purposes of the present invention generally include those compounds conforming to the formula $$TX_aR_b$$

wherein T is a metal of Group IVb (where the group number corresponds to the Mendeleev Periodic System); each X is any halogen; a is a number from 3 to 4; R is any alkyl, aryl, alkoxy or aryloxy radical; and b is a number from 0 to 1. It is pointed out that while, strictly speaking, silicon and germanium are not metals, it is intended and therefore it should be understood, that for the purposes of the present specification and claims, silicon and germanium are metals and the term "Group IVb metal compounds" includes compounds of silicon and germanium within the scope of the above formula.

Specific examples of compounds conforming to the above formula and which are suitable for the purposes of the present invention are:

tetrachlorogermane—$GeCl_4$;
tetrabromogermane—$GeBr_4$;
fluorotrichlorogermane $FGeCl_3$;
tetrabromostannane—$SnBr_4$;
tetrachlorostannane—$SnCl_4$;
dichlorodibromostannane—$Cl_2SnBr_2$;
trichlorobromostannane—$Cl_3SnBr$;
chlorotribromostannane—$ClSnBr_3$;
tetrachloroplumbane—$PbCl_4$;
tetrachlorosilane—$SiCl_4$;
trichlorofluorosilane—$Cl_3SiF$;
fluorotribromosilane—$FSiBr_3$;
fluorodichlorobromosilane—$FSiCl_2Br$;
methoxytribromogermane—$CH_3OGeBr_3$;
dichlorobromobenzylsilane—$C_6H_5CH_2Si(Br)Cl_2$;
trichloro-i-propoxysilane—$i\text{-}C_3H_7OSiCl_3$;
tribromophenoxystannane—$C_6H_5OSnBr_3$;

and the like.

It should be noted that, while compounds conforming to the above formula wherein $b$ equals 1 are useful for the purposes of the present invention, it is at once obvious that, in order to gain maximum increase in the quantity of hydroxyl groups on the surface of the finely-divided solid, compounds conforming to the above formula wherein $b$ equals 0 are preferably utilized.

It should further be noted that while fluoro-compounds conforming to the above formula are suitable for use in the process of the present invention, the use of said compounds generally results in the production of hydrogen fluoride which can attack glasswear and certain solids such as silica. Thus, it is generally preferred that compounds capable of forming hydrogen fluoride when reacted with hydroxyl groups on the surface of a finely-divided solid or when hydrolyzed not be utilized in the practice of the present invention.

The conditions under which reaction between the Group IV$b$ metal compound and hydroxyl groups on the surface of the solids can be accomplished are subject to considerable variation. However, in order to obtain products possessing a high order of activity and reproducible character and performance, it is normally necessary that the solid be essentially dry and anhydrous (i.e. free of molecular water in any form) at the time it is brought into contact with the Group IV$b$ metal compound. If the finely-divided solid to be utilized contains molecular water in any form and/or tends to adsorb same on exposure to humid atmospheres, etc., it should be dried immediately before use or, after drying, must be maintained continuously out of contact with water vapor until utilized. If the precaution of using a substantially anhydrous finely-divided solid is not observed, the desired chemical reaction either does not occur at all or does not predominate to the extent necessary to produce a desirable product.

The desired reaction can be carried out by contacting the solid with a Group IV$b$ metal compound, preferably a solution thereof in an inert hydrocarbon medium, and maintaining the two reactants in intimate contact for a period of time sufficient to effect the desired chemical reaction resulting in the chemical bonding of the Group IV$b$ metal to an oxygen atom in the surface of the finely-divided solid. It is believed, although there is no intent to be bound by this explanation, that the following illustrative equations wherein silica represents the finely-divided solid and silicon tetrachloride represents the Group IV$b$ metal compound correctly illustrate typical reactions:

Equation 1

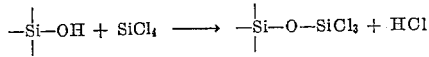

Equation 2

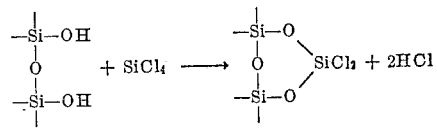

In general, the quantity of Group IV$b$ metal compound, the reaction temperature and time, and other factors would be chosen so as to minimize as much as possible the reaction typified by Equation 2.

The length of time required to effect a given amount of the above reactions is largely dependent upon the temperature of the reaction mixture. Generally speaking, any temperature between about 0° C. and about 300° C., can be used satisfactorily, but room temperature or higher will generally be used. It is pointed out in particular that the reaction between silicon and germanium compounds and hydroxyl groups on the surface of a solid often requires the use of higher temperatures such as 175° C. within the aforesaid range in order to drive the reaction towards completion. Assuming provision is made for intimate contact of the dry finely-divided solid and the Group IV$b$ metal compound, the time required to accomplish, to a substantial extent, the desired chemical reaction generally varies from periods of a few minutes at temperatures of about 150° C. or higher in the case of lead halides, to periods of days for silicon halides at temperatures of about 25° C. Temperatures substantially higher than about 300° C., e.g. 500° C., are normally completely needless.

Although use of the Group IV$b$ metal compounds in solution form gives excellent results, reaction of said compounds with the finely-divided solid can also be effected if the latter is exposed to sufficient quantities of the vapors of a metal compound under conditions of time and temperature similar to those discussed above. Said vapors can be supplied under their own vapor pressure using a partial vacuum if necessary or with the aid of a dry, inert carrier gas such as nitrogen. This vapor phase treatment can be accomplished in any suitable manner such as by circulating the vapors through the solid in a fixed or moving bed reactor.

Subsequent to the reaction of the finely-divided solid with the Group IV$b$ metal compound, hydrolysis of the surface reacted solid is effected by contacting said solid with molecular water. The manner in which said hydrolysis is accomplished is normally not critical. For instance, I find it convenient to place the surface reacted solid in a fixed bed apparatus and thereafter flow steam or an inert gas saturated with water vapor through the bed. Generally speaking, the temperature at which hydrolysis is accomplished is also subject to wide variation, although obviously the higher the temperature, the faster the hydrolysis reaction will normally be completed. Temperatures from above about the freezing point of water to about 300° C. are generally entirely satisfactory, although room temperature to about 125° C. will usually be preferred. It is pointed out that following said hydrolysis reaction, any excess moisture, i.e. molecular water, associated with the surface of the solid should be removed at temperatures as low as possible in order to minimize intramolecular condensation of the newly formed hydroxyl groups and the splitting off of water, the amount of condensation, all other factors being equal, normally increasing with temperature.

The following equations are believed to correctly illustrate the hydrolysis of the solid reaction products of Equation 1 and Equation 2 respectively:

Equation 3

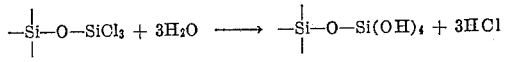

Equation 4

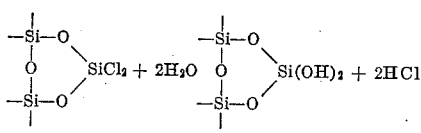

Clearly, the reaction illustrated by Equation 4 should normally be minimized as much as possible by minimizing as much as possible the reaction typified by Equation 2 as a net increase in hydroxyl group concentration is not normally achieved thereby.

It is often desirable that the improved solids resulting from the process of the present invention be substantially free from hydrogen halide by-products prior to the subsequent use thereof, particularly when said solids are to be utilized in the processes of the copending applications mentioned hereinbefore. Removal of said hydrogen halide by-products can generally be conveniently accomplished in any number of ways during the reaction of the solid with the Group IV$b$ metal compound and during the hydrolysis reactions. A particularly convenient method comprises sweeping the reaction zone continuously with a gas such as nitrogen or argon.

There follow a number of non-limiting, illustrative examples:

Example 1

There is charged into a 1000 milliliter reaction vessel 10 grams of "Cab-O-Sil," a pyrogenic silica produced by Cabot Corporation, having an average particle diameter of about 10 millimicrons, which silica had been calcined and possessed about 0.3 milliequivalent per gram of hydroxyl groups on the surface thereof. There is then added to the reaction vessel 700 milliliters of n-heptane and the resulting slurry is dried azeotropically by periodic distillation for about 20 hours until the remaining slurry comprises a volume of about 500 milliliters. Next, without exposure to the atmosphere, there is charged to said slurry 10 millimoles of titanium tetrachloride. The reaction mixture is then heated to and maintained at about 50° C. for about 24 hours while the HCl produced is removed by a stream of dry nitrogen which is bubbled through a dilute caustic trap. Subsequently, it is found that the quantity of HCl produced is about 0.3 milliequivalent per gram of silica thereby verifying that the concentration of hydroxyl groups chemically bound to the surface of said silica was about 0.3 milliequivalent per gram.

Example 2

There is charged to a 1000 milliliter reaction vessel 10 grams of "Cab-O-Sil" identical to that utilized in Example 1 and 820 milliliters of dodecane and the resulting slurry is dried azeotropically for 20 hours until the remaining slurry comprises a volume of about 600 milliliters. Next, without exposure to the atmosphere, there is charged to said slurry about 2.9 millimoles of silicon tetrachloride and the resulting mixture is heated to and maintained at about refluxing temperatures for about 12 hours while the HCl produced is removed by nitrogen sweep. The extent of the reaction between hydroxyl groups on the surface of the silica and the silicon tetrachloride is determined by measuring the quantity of HCl that is produced and by testing the liquid contents of the vessel for the absence therein of silicon tetrachloride and said silica is found to have 2.9 milliatoms of silicon chemically bound to the surface thereof. Next, the slurry is cooled to a temperature of about 50° C. and nitrogen, saturated with water vapor and heated to about 50° C. is bubbled beneath the surface thereof for about 6 hours.

The slurry is allowed to stand for about 10 hours and about 400 milliliters of the liquid phase is decanted therefrom. Next, about 600 milliliters of n-heptane is charged to the slurry and the resulting slurry is again azeotropically dried by periodic distillation for about 20 hours until about 300 milliliters of distillate is removed. Next, without exposure to the atmosphere, there is charged to said slurry 10 millimoles of titanium tetrachloride. The reaction mixture is then maintained at about 50° C. for about 24 hours while the HCl produced is removed by a stream of dry nitrogen. Subsequently, it is found that the quantity of HCl produced is about 0.8 milliequivalent per gram of silica and accordingly, that about 0.8 milliequivalent of hydroxyl groups per gram of silica were chemically bound to the surface of the silica.

Example 3

A sample of "Alon," a pyrogenic, substantially nonporous, alumina produced by Deutsche Gold- und Silber-Scheideanstalt Vormals Roessler, having an average particle diameter of about 10–40 millimicrons is determined to possess a hydroxyl group content on the surface thereof of about 0.7 milliequivalent per gram.

There is then charged to a static bed apparatus comprising a glass column 6 cms. in diameter and 50 cms. in length, 20 grams of "Alon" previously dried by heating in a vacuum oven for 24 hours at a temperature of about 110° C. Next, there is continuously recirculated through said alumina bed, 4 liters of dry nitrogen heated to about 160° C. Next, over a period of two hours, about 13 millimoles of germanium tetrachloride is volatilized and introduced into the nitrogen stream being recirculated through said bed. After about 8 hours, recirculation of said stream is arrested and the entire system is flushed with hot (100° C.) dry nitrogen, the effluent gases therefrom being led into a dilute caustic trap. The extent of reaction between the germanium tetrachloride and hydroxyl groups on the surface of the alumina is determined by measuring the amount of HCl produced and by testing the gaseous effluent for the absence therein of germanium tetrachloride and it is found that about 14 milliequivalents of HCl were produced and that about 13 milliatoms of germanium are chemically bound to the surface of said alumina. Next, nitrogen saturated with water vapor and heated to about 50° C., is passed through the bed, the gaseous effluent from the bed being passed through a trap containing dilute caustic. After about 24 hours, said water-saturated nitrogen stream is discontinued and a dry nitrogen stream heated to about 50° C. is passed through the bed for an additional 8 hours. The HCl that had emanated from the bed is then measured and is found to be about 38 milliequivalents which corresponds to a hydroxyl group concentration of about 1.9 milliequivalents per gram of treated alumina.

Obviously, many changes can be made in the above examples and disclosure without departing from the scope of the present invention.

For instance, although only tetrachlorosilane and tetrachlorogermane are mentioned in the above examples, other Group IV$b$ metal halides such as tetrabromostannane, trichlorobromosilane, dibromodichlorogermane and the like are also suitable.

Accordingly, it is intended that the above disclosure be regarded as illustrative and as in no way limiting the scope of the invention.

What I claim is:

1. A new composition comprising a finely-divided solid having oxygen atoms chemically bound in the surface thereof and carrying in chemical combination at least about $1 \times 10^{-5}$ equivalents per gram of surface structures conforming to the formula $$T(OH)_c R_b$$

wherein T is a metal of Group IV$b$; each OH is a hydroxyl group; $c$ is a number from 1 to 3; R is chosen from the group consisting of alkyl, aryl, alkoxy and aryloxy radicals; $b$ is a number from 0 to 1; and wherein said structures are chemically linked from T to at least one oxygen atom in the surface of said solid.

2. The composition of claim 1 wherein in said surface structures conforming to the formula $$T(OH)_c R_b$$

$c$ is 3 and $b$ is 0.

3. The composition of claim 1 wherein in said surface structures conforming to the formula $$T(OH)_c R_b$$

$c$ is 2 and $b$ is 0.

4. The composition of claim 1 wherein said finely divided solid is chosen from the group consisting of silica and alumina.

5. The composition of claim 1 wherein in said surface structures conforming to the formula $$T(OH)_c R_b$$

T is chosen from the group consisting of silicon and germanium.

6. The composition of claim 1 wherein the concentration of said surface structures is between about $1 \times 10^{-4}$ and about $2 \times 10^{-3}$ equivalents per gram.

7. A process for increasing the number of hydroxyl groups chemically bound to the surface of a finely-divided solid which comprises
    (a) reacting hydroxyl groups originally chemically bound to the surface of the finely-divided solid with a compound conforming to the formula $$TX_a R_b$$

wherein T is a metal of Group IV$b$; each X is any halogen; $a$ is a number from 3 to 4; R is chosen from the group consisting of alkyl, aryl, alkoxy and aryloxy radicals; $b$ is a number from 0 to 1; and $a+b$ equals 4; and
    (b) hydrolyzing the resulting surface structures.

8. The process of claim 7 wherein in the formula $$TX_a R_b$$

each X is chosen from the group consisting of chlorine and bromine.

9. The process of claim 7 wherein in the formula $$TX_a R_b$$

each X is chlorine.

10. The process of claim 7 wherein said original concentration of hydroxyl groups is at least about $1 \times 10^{-5}$ equivalents per gram.

11. The process of claim 7 wherein said solid has an average particle diameter of less than about 0.1 micron and has between about $1 \times 10^{-4}$ and about $2 \times 10^{-3}$ equivalents per gram of hydroxyl groups originally attached thereto.

12. The process of claim 11 wherein in the formula $$TX_a R_b$$

T is chosen from the group consisting of silicon and germanium; $a$ is 4 and $b$ is 0.

13. The process of claim 11 wherein the compound conforming to the formula $$TX_a R_b$$

is tetrachlorosilane.

14. The process of claim 11 wherein the compound conforming to the formula $$TX_a R_b$$

is tetrachlorogermane.

15. The process of claim 11 wherein said hydrolysis is accomplished at temperatures of between about 20° C. and about 125° C.

16. The process of claim 11 wherein said finely-divided solid is chosen from the group consisting of pyrogenic silica and alumina.

17. The process of claim 11 wherein said finely-divided solid is silica.

18. The process of claim 11 wherein said finely-divided solid is alumina.

References Cited

UNITED STATES PATENTS 3,274,120    9/1966    Aftandilian _____ 252—432

OTHER REFERENCES

Richter: Trans. Amer. Electrochem. Soc. 35 (1919), pages 323 and 324 relied on.

Vleeskens: "OH Groups on Silica Surfaces," pages 119–121 relied on.

DANIEL E. WYMAN, *Primary Examiner.*

OSCAR R. VERTIZ, *Examiner.*

A. GREIF, *Assistant Examiner.*